United States Patent
Taylor et al.

(10) Patent No.: US 9,598,926 B2
(45) Date of Patent: Mar. 21, 2017

(54) HYDRAULIC CABLE INJECTOR AND METHOD FOR CABLE DEPLOYMENT

(71) Applicant: Halliburton Energy Services, Inc., Houston, TX (US)

(72) Inventors: Arundel Leon Taylor, Duncan, OK (US); Marlin Robbert Sullivan, Marlow, OK (US); Dustin Myron Dell, Duncan, OK (US); Kevin Michael Stewart, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/777,563

(22) PCT Filed: Feb. 4, 2015

(86) PCT No.: PCT/US2015/014348
§ 371 (c)(1),
(2) Date: Sep. 16, 2015

(87) PCT Pub. No.: WO2016/126241
PCT Pub. Date: Aug. 11, 2016

(65) Prior Publication Data
US 2016/0356113 A1     Dec. 8, 2016

(51) Int. Cl.
*E21B 19/08* (2006.01)
*E21B 33/072* (2006.01)
(Continued)

(52) U.S. Cl.
CPC ............ *E21B 33/072* (2013.01); *E21B 17/20* (2013.01); *E21B 17/206* (2013.01); *E21B 19/08* (2013.01); *E21B 19/22* (2013.01)

(58) Field of Classification Search
CPC ...... E21B 33/072; E21B 17/20; E21B 17/206; E21B 19/08; E21B 19/22
See application file for complete search history.

(56) References Cited

U.S. PATENT DOCUMENTS

| 3,547,406 A | 12/1970 | Bielstein et al. |
| 5,503,370 A | 4/1996 | Newman et al. |

(Continued)

FOREIGN PATENT DOCUMENTS

WO     01/46735 A2     6/2001

OTHER PUBLICATIONS

International Search Report and Written Opinion for PCT/US2015/014348 dated Sep. 3, 2015.

(Continued)

*Primary Examiner* — Robert E Fuller
*Assistant Examiner* — David Carroll
(74) *Attorney, Agent, or Firm* — McDermott Will & Emery LLP (57) ABSTRACT

A hydraulic cable injector includes a first stripper assembly positioned at a first end of the hydraulic cable injector to receive a cable and provide a lower seal. A first wye joint is coupled to the first stripper assembly, and a flow tube assembly is operatively coupled to the first wye joint. A second wye joint is coupled to the flow tube assembly, and a second stripper assembly is coupled to the second wye joint and proves an upper seal. A third stripper assembly is positioned at a second end of the hydraulic cable injector for injecting the cable into a tubing and providing a tubing seal. A separator interposes the second and third stripper assemblies and defines a central pathway to feed the cable into the third stripper assembly from the second stripper assembly.

21 Claims, 3 Drawing Sheets

(51) Int. Cl.
*E21B 17/20* (2006.01)
*E21B 19/22* (2006.01)

(56) References Cited

U.S. PATENT DOCUMENTS

| | | | |
|---|---|---|---|
| 5,573,225 | A | 11/1996 | Boyle et al. |
| 5,599,004 | A | 2/1997 | Newman et al. |
| 5,699,996 | A * | 12/1997 | Boyle .................... H02G 1/086 254/134.3 FT |
| 5,992,250 | A * | 11/1999 | Kluth .................... E21B 17/003 254/134.4 |
| 6,532,839 | B1 * | 3/2003 | Kluth .................... E21B 17/003 166/385 |
| 7,152,685 | B2 | 12/2006 | Adnan et al. |
| 7,261,155 | B1 | 8/2007 | Ward et al. |
| 7,322,421 | B2 | 1/2008 | Blacklaw |
| 7,845,419 | B2 | 12/2010 | Naumann |
| 8,720,030 | B2 * | 5/2014 | Barker ................. G02B 6/4464 254/134.3 R |
| 2010/0096124 | A1 | 4/2010 | Naumann |
| 2011/0017444 | A1 | 1/2011 | McCollin |
| 2011/0079402 | A1 | 4/2011 | Darby et al. |
| 2015/0167411 | A1 * | 6/2015 | Sherman ................ E21B 19/22 166/379 |

OTHER PUBLICATIONS

Search Report received in corresponding Application NL1041635, dated Nov. 3, 2016.

* cited by examiner

HYDRAULIC CABLE INJECTOR AND METHOD FOR CABLE DEPLOYMENT

BACKGROUND

Flexible downhole tubing or "coiled tubing" is often extended downhole within a well to help facilitate various wellbore operations. Coiled tubing can reach upwards of 25,000 feet in length and is typically wound onto a large spool or reel from which it is drawn and progressively fed into the wellbore. Downhole tools can be coupled to the end of coiled tubing and simultaneously introduced into the wellbore to perform the various downhole operations. Since it is desirable to communicate with the downhole tools while in operation, communication lines and/or cables are often deployed with coiled tubing and communicably coupled to the downhole tools to facilitate communication between such downhole tools and the surface.

To deploy the cable with coiled tubing, the cable is often inserted or injected into the interior of the coiled tubing. In the past, to inject cable within coiled tubing, it was necessary to deploy the coiled tubing in a relatively straight line, such as deploying it within a vertical well or laying the coiled tubing horizontally on a straight stretch of land or road, and then progressively feeding the cable into the coiled tubing. As can be appreciated, this can result in a time-consuming, expensive and labor-intensive solution to the problem of installing cable within coiled tubing.

Today, three primary methods are employed to install cable into coiled tubing. The first method utilizes a simple flow tube attached directly to the coiled tubing, which creates a single pressure system in which the pressure drop across the flow tube combines with the pressure drop across the coiled tubing. Depending upon the stiffness of the cable selected, it may not be possible to reach the pump rates necessary to carry the cable before maximum pressure is exceeded.

The second method uses a mechanical injector to push the cable into the tubing. While this method provides a greater chance of success as compared to the first method, it is nonetheless quite inefficient. The injector is comprised of two polycarbonate wheels that grip the cable and thereby create a mechanical force independent of the pump rate in the coiled tubing. During the course of installation, the wheels typically wear out after approximately 8,000 feet of cable has been injected, and changing the wheels is very labor intensive and requires a considerable amount of down time. In addition, if there is fluid of any kind on the cable, or if the cable stops moving at any point, the wheels can lose traction and become unable to function and often must be changed. This method also tends to cause a significant amount of twisting and permanent deformation in the cable. As a result, cables installed using the mechanical injector cannot be removed and re-installed in a different string of coiled tubing, if desired.

The third method involves using a capstan device to deploy the cable. This method is expensive, labor intensive, and the capstan device is much too large for easy transport to well sites.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore operations and, more particularly, to methods and apparatus for injecting cable into tubing.

Embodiments of the present disclosure provide a hydraulic cable injector used to inject a cable, such as fiber optic cable, into a tubing, such as coiled tubing. The cable may be introduced into the hydraulic cable injector at one end and the tubing may be coupled to the hydraulic cable injector at the opposing end to receive the cable. The hydraulic cable injector circulates a first fluid through a first fluid circuit to advance the cable through the hydraulic cable injector and into the tubing. A second fluid may be circulated through the tubing to help the cable advance further through the tubing. Three stripper assemblies and a separator may be included in the hydraulic cable injector and may cooperatively operate to seal the hydraulic cable injector and prevent the first and second fluids from comingling. Moreover, the three stripper assemblies and the separator may operate to prevent the fluid pressures within the first and second fluid circuits from interacting. Accordingly, the hydraulic cable injector and the tubing encompass two separate pressure systems, which allows for independent pump rates and pressures in the hydraulic cable injector and the tubing, respectively. As a result, the hydraulic cable injector may be capable of installing very stiff cables into the tubing.

The various components of the hydraulic cable injector may be customized to install varying sizes and types of cables within the tubing. Moreover, the hydraulic cable injector may be able to install the cable without significant deformation. As a result, the cable may subsequently be removed from the tubing and installed into another tubing, if desired. Furthermore, most of the components of the hydraulic cable injector utilize discharge iron (i.e., component parts that are commonly found on a drill or rig site). As a result, the more complex components of the hydraulic cable injector may be delivered to a job site via a storage case, such as a PELICAN® case, for example, and combined with common discharge iron components to assemble the hydraulic cable injector. As can be appreciated, this may allow for easy transportation and storage of the hydraulic cable injector.

Figure 1:
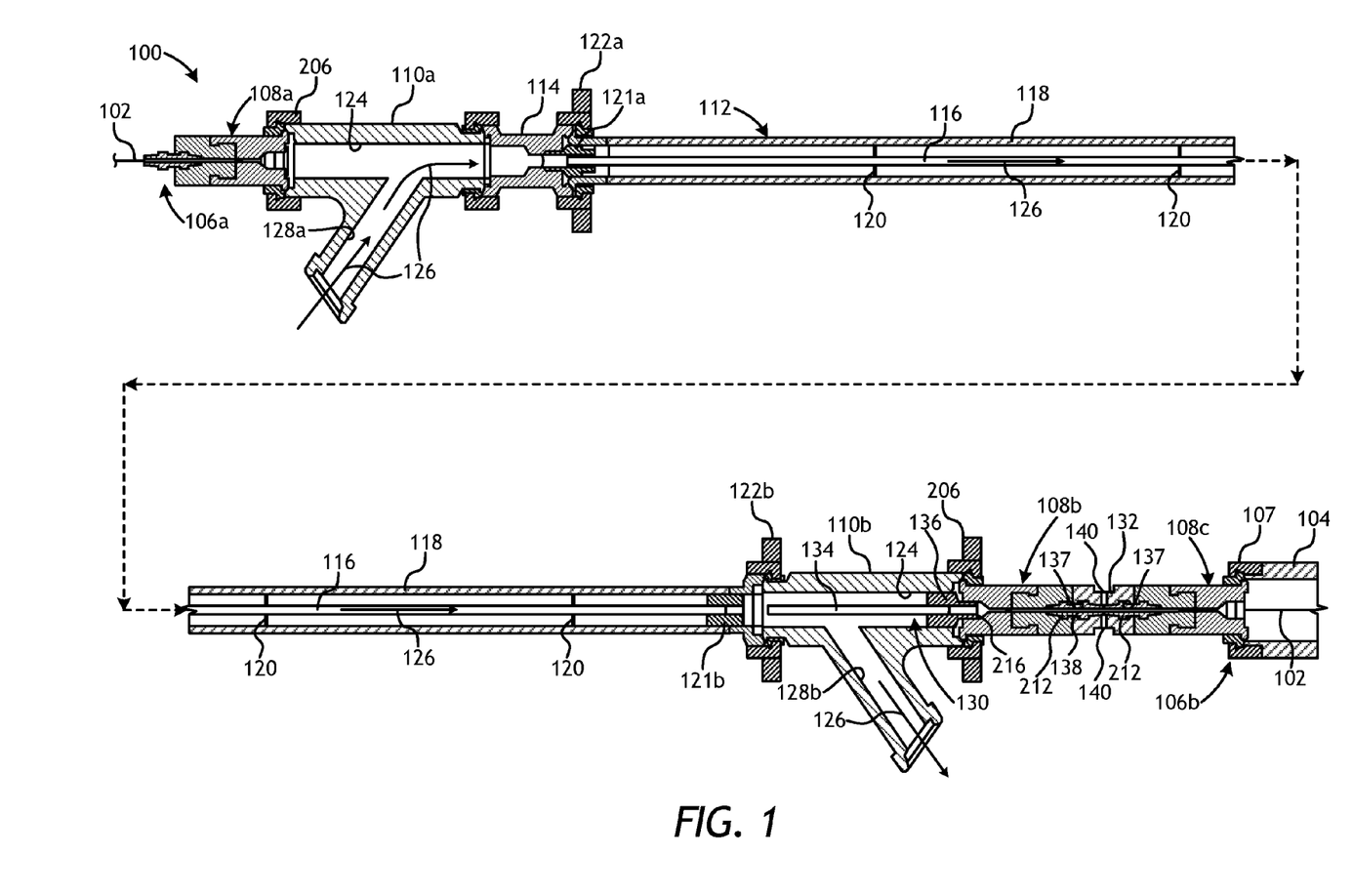
FIG. 1 is a cross-sectional side view of an exemplary hydraulic cable injector.

Referring to FIG. 1, illustrated is a cross-sectional side view of an exemplary hydraulic cable injector 100, according to one or more embodiments of the present disclosure. The hydraulic cable injector 100 (hereafter "the injector 100") may be used to insert or otherwise inject a cable 102 into a tubing 104. The cable 102 may comprise any type of wire, cable, line, or conduit that may be used in the oil and gas industry. More particularly, the cable 102 may include, but is not limited to, a fiber optic cable, wireline, braided wire cable, slickline, an electricity-conducting wire (e.g., e-line), a capillary, or any combination thereof. The tubing 104 may comprise any pipeline or conduit used in the oil and gas industry including, but not limited to, coiled tubing, casing, production tubing, drill string, or any combination thereof.

While the injector 100 is generally described herein in conjunction with use in the oil and gas industry, it will be appreciated that the principles of the present disclosure are equally applicable to other industries that may benefit from the ability to inject a cable 102 into a tubing 104, without departing from the scope of this disclosure. For instance, the principles of the present disclosure may be equally applicable to the mining industry, public works industries, and others.

The injector 100 may have a first end 106a and a second end 106b. The cable 102 is depicted in FIG. 1 as extending out of both ends 106a,b of the injector 100, but omitted between the ends 106a,b for clarity. At the first end 106a, the cable 102 may be introduced or otherwise drawn into the injector 100 from a reel or spool (not shown) upon which the cable 102 may be mounted. At the second end 106b, the cable 102 may be introduced, injected, or otherwise drawn into the interior of the tubing 104. The injector 100 may have a tubing connector 107 arranged at the second end 106b, as illustrated, and used to couple the tubing 104 to the injector 100. In some embodiments, such as embodiments where the tubing 104 comprises coiled tubing, the tubing 104 may also be mounted on a reel or spool (not shown) and the cable 102 may be inserted into the length of the tubing 104 while mounted on the reel. In other embodiments, however, the tubing 104 may be situated in a generally straight line, such as laid out on a stretch of ground or extended downhole within a wellbore, without departing from the scope of the disclosure.

The injector 100 may include three stripper assemblies 108, shown as a first or lower stripper assembly 108a, a second or upper stripper assembly 108b, and a third or tubing stripper assembly 108c. As described in more detail below, the stripper assemblies 108a-c may prove advantageous in hydraulically sealing the injector 100 such that fluid pressure within the injector 100 is prevented from interacting with fluid pressure within the tubing 104. The first stripper assembly 108a may be positioned at the first end 106a of the injector 100 and generally used to receive the cable 102 into the injector 100 and provide a lower seal for the injector 100 at the first end 106a. The second stripper assembly 108b may structurally interpose the first and third stripper assemblies 108a,c along the length of the injector 100 and may generally be used to provide an upper seal for the injector 100 that maintains fluid pressure within the injector 100 between the first and second stripper assemblies 108a,b. The third stripper assembly 108c may be positioned at the second end 106b of the injector 100 and generally used to discharge the cable 102 into the tubing 104. Moreover, the third stripper assembly 108c may be configured to provide a tubing seal that prevents fluids within the tubing 104 from migrating from the tubing 104 into the injector 100.

Figures 2A, 2B:
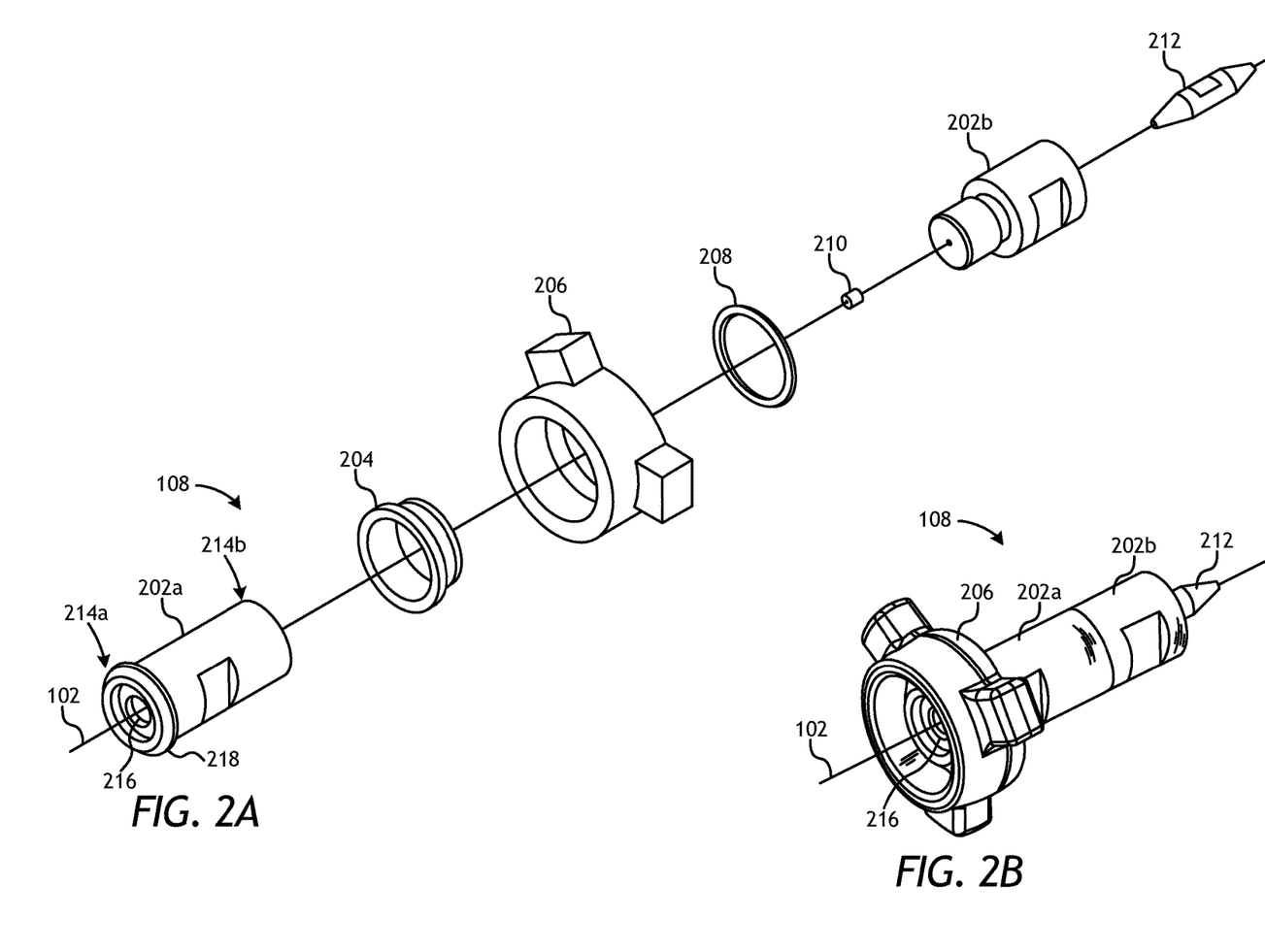
FIGS. 2A and 2B depict exploded and assembled isometric views, respectively, of an example stripper assembly.

Referring briefly to FIGS. 2A and 2B, with continued reference to FIG. 1, illustrated are exploded and assembled isometric views, respectively, of an exemplary stripper assembly 108, according to one or more embodiments. The stripper assembly 108 may be representative of any of the first, second, or third stripper assemblies 108a-c of FIG. 1. The cable 102 may be configured to extend through the center of the stripper assembly 108. As illustrated, the stripper assembly 108 may include a first or upper pack-off housing 202a, a second or lower pack-off housing 202b, a retainer 204, a coupling 206, a retainer ring 208, a gasket 210, and a cable guide 212. The upper pack-off housing 202a may have a first end 214a and a second end 214b. In some embodiments, a threaded aperture 216 may be defined at the first end 214a and configured to receive another threaded component of the injector 100 (FIG. 1), as described in more detail below.

The retainer 204 and the coupling 206 may be sized and otherwise configured to extend over the outer surface of the upper pack-off housing 202a. The coupling 206 may be a threaded coupling, such as a union wing coupling. As described in more detail below, the coupling 206 may be configured to threadably couple the stripper assembly 108 to another threaded component of the injector 100 (FIG. 1) at the first end 214a and the retainer ring 208 may retain the coupling 206 in place once threaded to the other threaded component. The retainer 204 and a radial shoulder 218 defined on the outer surface of the upper pack-off housing 202a allow the coupling 206 to be torqued and otherwise tightened to a threaded component without separating from the upper pack-off housing 202a, and thereby being able to secure the stripper assembly 108 to the threaded component.

The gasket 210 may be made of a flexible material, such as rubber or an elastomer. During assembly of the stripper assembly 108, the gasket 210 may be introduced into the interior of the upper pack-off housing 202a at the second end 214b and seated within a cavity (not shown) defined within the upper pack-off housing 202a and designed to receive the gasket 210. The lower pack-off housing 202b may then be coupled to the upper pack-off housing 202a at the second end 214b to secure the gasket 210 within the upper pack-off housing 202a. In some embodiments, the lower pack-off housing 202b may be mechanically fastened to the upper pack-off housing 202a at the second end 214b, such as through the use of using bolts, screws, snap rings, pins, etc. In other embodiments, however, the lower pack-off housing 202b may be threaded into the upper pack-off housing 202a at the second end 214b such that a portion of the lower pack-off housing 202b extends into the upper pack-off housing 202a. In either case, the lower pack-off housing 202b may be configured to engage and compress the gasket 210 within the upper pack-off housing 202a such that the gasket 210 is able to sealingly engage the outer surface of the cable 102 extending through the stripper assembly 108 and, more particularly, through the center of the gasket 210. Once sealingly engaged against the outer surface of the cable 102, the gasket 210 may substantially prevent fluid migration in either direction past that point within the injector 100 (FIG. 1), but may allow the cable 102 to nonetheless advance through the stripper assembly 108 in either direction.

The cable guide 212 may be made of, for example, brass or another soft or malleable material. The cable guide 212 may extend at least partially into the lower pack-off housing 202b and be coupled thereto to receive the cable 102 from the gasket 210. In some embodiments, for instance, the cable guide 212 may be threaded into a corresponding aperture (not shown) defined in the lower pack-off housing 202b. In other embodiments, the cable guide 212 may be mechanically fastened to the lower pack-off housing 202b using, for example, one or more bolts, screws, snap rings, pins, etc. In some embodiments, such as in the case of the first stripper assembly 108a (FIG. 1), the opposing end of the cable guide 212 may be configured to receive the cable 102 into the first stripper assembly 108a and, therefore, into the injector 100 (FIG. 1). In other embodiments, however, such as in the case of the second and third stripper assemblies 108b,c, the opposing end of the cable guide 212 may be coupled to another component of the injector 100, as described in more detail below.

Referring again to FIG. 1, the injector 100 may further include a first or lower wye joint 110a, a second or upper wye joint 110b, and a flow tube assembly 112 that interposes the upper and lower wye joints 110a,b. In some embodiments, the injector 100 may also include a flow tube anchor 114 used to operatively couple the lower wye joint 110a to the flow tube assembly 112. In other embodiments, however, the flow tube anchor 114 may be omitted and the lower wye joint 110a may instead be directly coupled to the flow tube assembly 112, without departing from the scope of the disclosure.

The flow tube assembly 112 may include a flow tube 116 and a discharge joint 118 configured to receive and otherwise house the flow tube 116. The flow tube 116 may be a pipe or conduit extending between a lower fitting 121a and an upper fitting 121b and may be configured to receive the cable 102. In some embodiments, the flow tube 116 may comprise a single monolithic conduit that extends between the lower and upper fittings 121a,b. In other embodiments, however the flow tube 116 may comprise two or more coupled conduit lengths or segments that may be assembled on site.

The discharge joint 118 may provide structural support for the flow tube 116. In at least one embodiment, for instance, the flow tube 116 may include one or more centralizers 120 (four shown) disposed about the outer surface of the flow tube 116 and positioned at discrete locations along the length of the flow tube 116. The centralizers 120 may operate to centralize the flow tube 116 within the discharge joint 118 during operation. Moreover, the discharge joint 118 may prove advantageous in containing hydraulic pressure or fluids in the event there is a failure in the flow tube 116 during operation of the injector 100. Accordingly, the discharge joint 118 may further serve as a safety containment structure. In some embodiments, however, the discharge joint 118 may be omitted from the flow tube assembly 112 and the flow tube 116 may be structurally supported by virtue of its own rigidity.

The lower wye joint 110a may be coupled to the first stripper assembly 108a at one end and operatively coupled to the flow tube assembly 112 at the opposing end. As illustrated, the coupling 206 associated with the first stripper assembly 108a may be threaded to the lower wye joint 110a. In other embodiments, however, the lower wye joint 110a may be coupled to the first stripper assembly 108a by other means, such as using one or more mechanical fasteners (e.g., bolts, screws, snap rings, pins, etc.), welding, industrial adhesives, or any combination thereof. In the illustrated embodiment, the flow tube anchor 114 is depicted as interposing the lower wye joint 110a and the flow tube assembly 112. The flow tube anchor 114 may be coupled to the discharge joint 118, for example, by using a first threaded coupling 122a or any other type of coupling mechanism (e.g., mechanical fasteners, welds, industrial adhesives, etc.). The flow tube anchor 114 may prove advantageous in providing a stable coupling location between the lower wye joint 110a and the flow tube assembly 112. Moreover, in some embodiments, a filter (not shown) may be positioned within the flow tube anchor 114 and used to filter fluids flowing through the injector 100. As indicated above, however, the flow tube anchor 114 may be omitted from the injector 100, in at least one embodiment, and the lower wye joint 110a may alternatively be coupled directly to the discharge joint 118, without departing from the scope of the disclosure. Accordingly, operatively coupling the flow tube assembly 112 to the lower wye joint 110a may encompass any direct or indirect coupling between the two components.

The upper wye joint 110b may generally interpose the flow tube assembly 112 and the second stripper assembly 108b. More particularly, the upper wye joint 110b may be coupled to the discharge joint 118 at one end, for example, by using a second threaded coupling 122b or any other type of coupling mechanism (e.g., mechanical fasteners, welds, industrial adhesives, etc.). Moreover, the upper wye joint 110b may be coupled to the second stripper assembly 108b at its opposing end, such as being threadably coupled to the second stripper assembly 108b using the coupling 206 associated with the second stripper assembly 108b.

The lower and upper wye joints 110a,b may each define a central passageway 124 that allows the cable 102 to pass therethrough and provides a conduit for a fluid 126 to flow through the injector 100 and, more particularly, through the flow tube assembly 112. Each wye joint 110a,b may define and otherwise provide a flow port 128, shown as a first flow port 128a provided on the lower wye joint 110a and a second flow port 128b provided on the upper wye joint 110b. The first and second flow ports 128a,b may be in fluid communication with the central passageway 124 of each corresponding wye joint 110a,b. The first flow port 128a may provide an inlet for the fluid 126 to enter the injector 100, and the second flow port 128b may provide an outlet for the fluid 126 to exit the injector 100 after having circulated through the flow tube assembly 112. The central passageways 124 may be in fluid communication with each other via the flow tube 116 such that the fluid 126 is able to circulate through the injector 100 by being injected into the lower wye joint 110a via the first flow port 128a, circulated through the flow tube assembly 112 via the flow tube 116, and discharged from the upper wye joint 110b via the second flow port 128b. The first and second stripper assemblies 108a,b may be configured to substantially prevent the fluid 126 from migrating to other portions of the injector 100 and may otherwise maintain fluid pressure within the injector 100 across the lower and upper wye joints 110a,b and the flow tube assembly 112.

Figure 3:
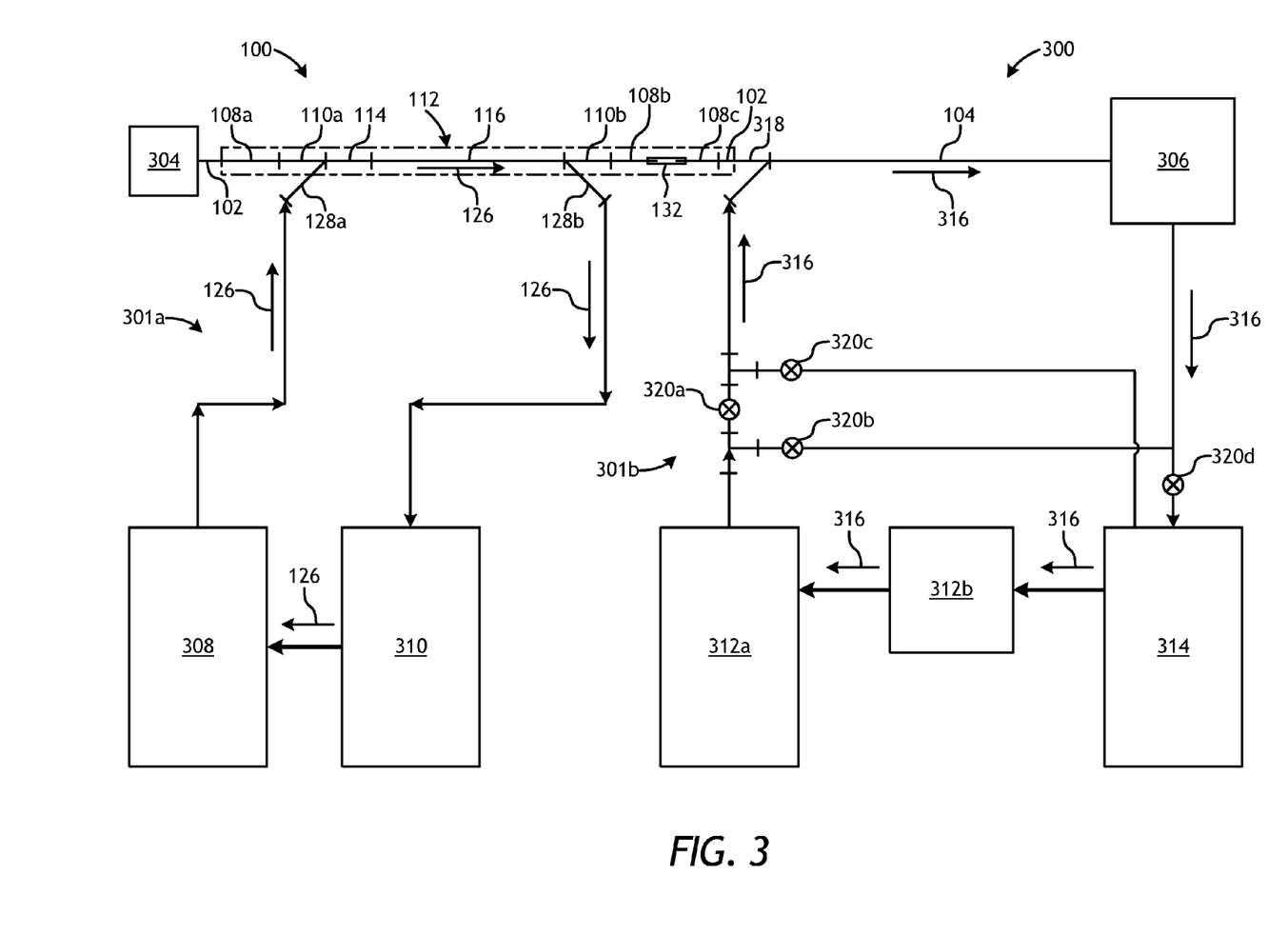
FIG. 3 is a schematic diagram of an exemplary cable injector system.

Referring now to FIG. 3, with continued reference to FIG. 1, illustrated is a schematic diagram of an exemplary cable injector system 300, according to one or more embodiments. As illustrated, the cable injector system 300 may include the injector 100, a first fluid circuit 301a, and a second fluid circuit 301b. The fluid 126 may be circulated through the first fluid circuit 301a and generally used to draw the cable 102 into the injector 100 and thereby advance the cable 102 into the tubing 104. As illustrated, the cable 102 may originate from a spooler 304, from which it may be drawn, and the tubing 104 may be mounted on a reel 306.

The first fluid circuit 301a may include an injector pump 308 and a return tank 310 fluidly coupled to the injector pump 308. The injector pump 308 may also be fluidly coupled to the first flow port 128a via suitable piping and/or fluid conduits and may be configured to draw the fluid 126 from the return tank 310 and convey the fluid 126 into the injector 100 via the first flow port 128a. Once in the injector 100, the fluid 126 is prevented from generally migrating toward the spooler 304 by the lower seal generated by the first stripper assembly 108a. Instead, the fluid 126 is flowed through the lower wye joint 110a and the flow tube anchor 114 (if used) and enters the flow tube 116 of the flow tube assembly 112. The flow tube 116 may exhibit a reduced diameter that allows the fluid 126 to apply a friction drag force on the cable 102, which results in the cable 102 being advanced through the flow tube 116 as the fluid 126 flows therethrough.

As will be appreciated, the diameter of the flow tube 116 (and the other components of the injector 100) may vary to accommodate different sizes and types of the cable 102 (e.g., fiber optic, slickline, wireline, etc.). The injector pump 308 may be configured to pump the fluid 126 at a flow rate sufficient to overcome the drag friction generated by the three stripper assemblies 108a,c and any snubbing force generated in the tubing 104. In some embodiments, back tension on the cable 102 may be applied at the spooler 308 to control the feed rate (i.e., speed) of the cable 102 into the injector 100 such that the cable 102 does not bind up inside the flow tube 116 or at any other location within the injector 100.

The fluid 126 may then flow out of the flow tube 116 and enter the upper wye joint 110b where the fluid 126 is prevented from migrating past the second stripper assembly 108b due to the upper seal generated by the second stripper assembly 108b. Instead, the fluid 126 is diverted and flowed through the upper wye joint 110b to exit the injector 100 via the second flow port 128b, which may be fluidly coupled to the return tank 310 via suitable piping and/or fluid conduits. The fluid 126 may be collected within the return tank 310 until recycled back into the first fluid circuit 301a with the injector pump 308. In some embodiments, the fluid 126 may be clean water (e.g., fresh or salt), but may alternatively be another type of liquid.

Referring again to FIG. 1, the injector 100 may further include a cable guide assembly 130 generally positionable within the upper wye joint 110b and a separator 132 that interposes the second and third stripper assemblies 108b,c. As illustrated, the cable guide assembly 130 may include a pipe segment 134 coupled to a fitting 136. The pipe segment 134 may be configured to receive the cable 102 from the flow tube 116 and convey the cable 102 into the second stripper assembly 108b. In some embodiments, the pipe segment 134 may exhibit the same or substantially the same diameter as the flow tube 116. The fitting 136 may be similar to the fittings 121a,b and may otherwise be configured to couple the cable guide assembly 130 to the second stripper assembly 108b. In some embodiments, for instance, the fitting 136 may be threaded into the threaded aperture 216 of the second stripper assembly 108b. In other embodiments, however, the fitting 136 may be coupled to the second stripper assembly 108b by other means, such as by using one or more mechanical fasteners, welding, industrial adhesives, or any combination thereof. In operation, the cable guide assembly 130 may provide structural stability for the cable 102 as it transitions through the upper wye joint 110b and into the second stripper assembly 108b.

The separator 132 may couple the second and third stripper assemblies 108b,c at via opposing axial ends of the separator. In some embodiments, for instance, the cable guide 212 of each stripper assembly 108b,c may be threaded into corresponding apertures 137 defined in the separator 132 at its opposing axial ends. The separator 132 may define a central pathway 138 that allows the cable 102 to pass through the separator 132 and otherwise extend between the second and third stripper assemblies 108b,c.

The separator 132 may be configured to align the injector 100 with the tubing 104 and ensure that the fluid pressure within the injector 100 does not interact with the fluid pressure within the tubing 104. More specifically, while the second stripper assembly 108b provides an upper seal for the injector 100, and the third stripper assembly 108c provides a tubing seal for the tubing 104, the separator 132 may provide an atmospheric buffer between the injector 100 and the tubing 104. To accomplish this, the separator 132 may include one or more vents 140 that extend radially outward from the central pathway 138 and provide fluid communication between the central pathway 138 and the surrounding environment. The vents 140 may allow fluid pressure escaping from the injector 100 via the second stripper assembly 108b to escape into the atmosphere at the separator 132, and also allow fluid pressure escaping from the tubing 104 via the third stripper assembly 108c to escape into the atmosphere at the separator 132.

Referring again to FIG. 3, with continued reference to FIG. 1, description and operation of the second fluid circuit 301b is now provided. As illustrated, the second fluid circuit 301b may include one or more tubing pumps 312 (shown as a first tubing pump 312a and a second tubing pump 312b) and a return tank 314 fluidly coupled to the tubing pump(s) 312a,b. The second tubing pump 312b may be a small centrifugal pump that mixes a friction reducing agent with water from the return tank 314, and feed the mixed fluid solution to the first pump 312a. The tubing pump(s) 312a,b may be fluidly coupled to the tubing 104 via suitable piping and/or fluid conduits and may be configured to pump a fluid 316 into the tubing 104. More particularly, a tubing wye joint 318 (or similar hydraulic fitting) may be positioned in the tubing 104 and otherwise provide an inlet to inject the fluid 316 into the tubing 104.

Once in the tubing 104, the fluid 316 may be prevented from migrating into the injector 100 by the tubing seal generated by the third stripper assembly 108c, and may instead be flowed through the tubing 104. Similar to the fluid 126 circulated in the first fluid circuit 301a, the fluid 316 circulated in the second fluid circuit 301b may apply a friction drag force on the cable 102, which results in the cable 102 being advanced through the tubing 104 as the fluid 316 flows therethrough. The fluid 316 may be pumped into the tubing 104 with the tubing pump(s) 312a,b at a flow rate sufficient to overcome the friction forces between the cable 102 and the tubing 104, and thereby allowing the cable 102 to advance within the tubing 104. The flow rate required to carry the cable 102 through the tubing 104 may be dependent on the inside diameter of the tubing 104.

After circulating through all or a portion of the tubing 104, the fluid 316 may exit the tubing 104 and flow to the return tank 314 fluidly coupled to the tubing 104 via suitable piping and/or fluid conduits. The fluid 316 may then be collected within the return tank 314 until recycled back into the second fluid circuit 301b with the tubing pump(s) 312a,b. The fluid 316 circulating in the second circuit 301b may be the same as (e.g., water) or different than the fluid 216 circulating in the first circuit 301a. In at least one embodiment, for instance, the fluid 316 may comprise a liquid solution that includes water and a friction-reducing chemical, such as FR-66™ available from Halliburton Energy Services of Houston, Tex., USA. The friction-reducing chemical may provide the fluid 316 with a lubricious effect that helps the cable 102 traverse the tubing 104, even in embodiments where the tubing 104 is coiled and otherwise mounted on the reel 306. Importantly, however, the third stripper assembly 108c and the separator 132 may operate to maintain the fluid circuits 301a,b separate such that the fluids 126, 316 do not mix or otherwise migrate past the second end 106b (FIG. 1) of the injector 100 in either direction.

The second fluid circuit 301b may further include one or more valves 320 used to direct fluid flow within the second fluid circuit 301b. In the illustrated embodiment, the second fluid circuit 301b is depicted as including a first valve 320a, a second valve 320b, a third valve 320c, and a fourth valve 320d. The first valve 320a is generally positioned between the tubing pump(s) 312a,b and the tubing 104, and the fourth valve 320d is generally positioned between the reel 316 and the return tank 314. To flow the fluid 316 through the tubing 104 and thereby help advance the cable 102 within the tubing 104, the first and fourth valves 320a,c may be opened while the second and third valves 320b,c may be closed. In the event reverse flow through the tubing 104 is desired, the first and fourth valves 320a,c may be closed while the second and third valves 320b,c may be opened. Reverse flow may be required when the cable 102 becomes stuck in the tubing 104 or when the cable 102 is removed from the tubing 104 altogether, such as when the cable 102 becomes damaged during operation or when the tubing 104 is to be retired following excessive fatigue.

The various components of the injector 100 described herein may be customized to be able to inject varying sizes and/or types of cables 102 within the tubing 102. For instance, the respective internal diameters of the stripper assemblies 108a-c, the flow tube 116, and the separator 132 may vary to accommodate arrange of cable 102 diameters. Moreover, the injector 100 may be able to inject the cable 102 into the tubing 104 without significant deformation. As a result, the cable 102 may subsequently be removed from the tubing 104 and installed into another tubing, if desired.

It should be noted that the lower and upper wye joints 110a,b, the flow tube anchor 114, the discharge joint 118, and the tubing wye joint 318 may each comprise "discharge iron," or component parts that are commonly found on a rig site or wellhead installation. As a result, the more complex components of the injector 100, such as the stripper assemblies 108a-c, the flow tubing 116, and the separator 132, may be delivered to a job site via a storage case, for example, and combined with the common discharge iron components in assembling the injector 100. As can be appreciated, this may allow for easy transportation and storage of the injector 100.

Embodiments disclosed herein include:

A. A hydraulic cable injector that includes a first stripper assembly positioned at a first end of the hydraulic cable injector to receive a cable and provide a lower seal at the first end, a first wye joint coupled to the first stripper assembly, a flow tube assembly operatively coupled to the first wye joint and having a flow tube that receives the cable after the cable extends through the first wye joint, a second wye joint coupled to the flow tube assembly, a second stripper assembly coupled to the second wye joint and providing an upper seal, wherein the lower and upper seals prevent a first fluid from migrating past the first and second stripper assemblies, respectively, a third stripper assembly positioned at a second end of the hydraulic cable injector for injecting the cable into a tubing, the third stripper assembly providing a tubing seal that prevents a second fluid in the tubing from migrating past the third stripper assembly, and a separator interposing the second and third stripper assemblies and defining a central pathway that feeds the cable into the third stripper assembly from the second stripper assembly.

B. A cable injector system that includes a cable, a hydraulic cable injector having a first end and a second end and including, a first stripper assembly positioned at the first end to receive the cable and provide a lower seal for the hydraulic cable injector at the first end, a first wye joint coupled to the first stripper assembly, a flow tube assembly operatively coupled to the first wye joint and having a flow tube that receives the cable after the cable extends through the first wye joint, a second wye joint coupled to the flow tube assembly, a second stripper assembly coupled to the second wye joint and providing an upper seal for the hydraulic cable injector, a third stripper assembly positioned at the second end and providing a tubing seal, and a separator interposing the second and third stripper assemblies and defining a central pathway that feeds the cable into the third stripper assembly from the second stripper assembly. The cable injector system further includes a tubing coupled to the second end of the hydraulic cable injector to receive the cable from the third stripper assembly, a first fluid circuit for circulating a first fluid through the flow tube, wherein the lower and upper seals prevent the first fluid from migrating past the first and second stripper assemblies, respectively, and a second fluid circuit for circulating a second fluid through the tubing, wherein the tubing seal prevents the second fluid from migrating past the third stripper assembly and commingling with the first fluid.

C. A method that includes introducing a cable into a first end of a hydraulic cable injector, the hydraulic cable injector having a first stripper assembly positioned at the first end to receive the cable, a first wye joint coupled to the first stripper assembly, a flow tube assembly operatively coupled to the first wye joint, and a second wye joint coupled to the flow tube assembly, wherein the flow tube assembly has a flow tube that receives the cable after the cable extends through the first wye joint, circulating a first fluid through the flow tube via a first fluid circuit, preventing the first fluid from migrating past the first stripper assembly with a lower seal generated by the first stripper assembly at the first end, preventing the first fluid from migrating past the second stripper assembly with an upper seal generated by a second stripper assembly coupled to the second wye joint, injecting the cable into a tubing coupled to a second end of the hydraulic cable injector, the hydraulic cable injector having a third stripper assembly positioned at the second end, circulating a second fluid through the tubing via a second fluid circuit, and preventing the second fluid from migrating past the third stripper assembly and commingling with the first fluid with a tubing seal generated by the third stripper assembly.

Each of embodiments A, B, and C may have one or more of the following additional elements in any combination: Element 1: wherein the cable is selected from the group consisting of a fiber optic cable, wireline, braided wire cable, slickline, an electricity-conducting wire, a capillary, or any combination thereof. Element 2: further comprising a flow tube anchor that interposes the lower wye joint and the flow tube assembly. Element 3: wherein the flow tube assembly further comprises a discharge joint operatively coupled to the first wye joint at a first axial end and coupled to the second wye joint at a second axial end, wherein the flow tube is received within the discharge joint. Element 4: further comprising one or more centralizers disposed about an outer surface of the flow tube to centralize the flow tube within the discharge joint. Element 5: wherein the first wye joint provides a first flow port and the second wye joint provides a second flow port, and wherein the first fluid is introduced into the flow tube assembly via the first flow port and discharged from the flow tube assembly via the second flow port. Element 6: further comprising a cable guide assembly positioned within the second wye joint to transfer the cable from the second wye joint to the second stripper assembly. Element 7: wherein the separator is coupled to the second stripper assembly at one axial end and coupled to the third stripper assembly at an opposing axial end.

Element 8: wherein the cable is selected from the group consisting of a fiber optic cable, wireline, braided wire cable, slickline, an electricity-conducting wire, a capillary, or any combination thereof. Element 9: wherein the tubing is selected from the group consisting of coiled tubing, casing, production tubing, drill string, or any combination thereof. Element 10: wherein the separator provides an atmospheric buffer between the hydraulic cable injector and the tubing. Element 11: wherein the first fluid is water and the second fluid is a liquid solution. Element 12: wherein the liquid solution includes a friction-reducing chemical. Element 13: wherein the first wye joint provides a first flow port and the second wye joint provides a second flow port, and wherein the first fluid is introduced into the hydraulic cable injector via the first flow port and discharged from the hydraulic cable injector via the second flow port. Element 14: further comprising a flow tube anchor that interposes the lower wye joint and the flow tube assembly.

Element 15: wherein the first fluid is water, and wherein circulating the first fluid through the flow tube comprises applying a friction drag force on the cable with the first fluid to advance the cable through the flow tube. Element 16: wherein circulating the second fluid through the tubing via the second fluid circuit comprises applying a friction drag force on the cable with the second fluid to advance the cable through the tubing. Element 17: further comprising applying back tension on the cable as the cable is introduced into the first end of the hydraulic cable injector. Element 18: further comprising providing an atmospheric buffer between the hydraulic cable injector and the tubing with a separator interposing the second and third stripper assemblies.

By way of non-limiting example, exemplary combinations applicable to A, B, and C include: Element 4 with Element 4; and Element 11 with Element 12.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A hydraulic cable injector, comprising:
   a first stripper assembly positioned at a first end of the hydraulic cable injector to receive a cable and provide a lower seal at the first end;
   a first wye joint coupled to the first stripper assembly;
   a flow tube assembly operatively coupled to the first wye joint and having a flow tube that receives the cable after the cable extends through the first wye joint;
   a second wye joint coupled to the flow tube assembly;
   a second stripper assembly coupled to the second wye joint and providing an upper seal, wherein the lower and upper seals prevent a first fluid from migrating past the first and second stripper assemblies, respectively;
   a third stripper assembly positioned at a second end of the hydraulic cable injector for injecting the cable into a tubing, the third stripper assembly providing a tubing seal that prevents a second fluid in the tubing from migrating past the third stripper assembly; and
   a separator interposing the second and third stripper assemblies and defining a central pathway that feeds the cable into the third stripper assembly from the second stripper assembly.

2. The hydraulic cable injector of claim 1, wherein the cable is selected from the group consisting of a fiber optic cable, wireline, braided wire cable, slickline, an electricity-conducting wire, a capillary, or any combination thereof.

3. The hydraulic cable injector of claim 1, further comprising a flow tube anchor that interposes the lower wye joint and the flow tube assembly.

4. The hydraulic cable injector of claim 1, wherein the flow tube assembly further comprises a discharge joint operatively coupled to the first wye joint at a first axial end and coupled to the second wye joint at a second axial end, wherein the flow tube is received within the discharge joint.

5. The hydraulic cable injector of claim 4, further comprising one or more centralizers disposed about an outer surface of the flow tube to centralize the flow tube within the discharge joint.

6. The hydraulic cable injector of claim 1, wherein the first wye joint provides a first flow port and the second wye joint provides a second flow port, and wherein the first fluid is introduced into the flow tube assembly via the first flow port and discharged from the flow tube assembly via the second flow port.

7. The hydraulic cable injector of claim 1, further comprising a cable guide assembly positioned within the second wye joint to transfer the cable from the second wye joint to the second stripper assembly.

8. The hydraulic cable injector of claim 1, wherein the separator is coupled to the second stripper assembly at one axial end and coupled to the third stripper assembly at an opposing axial end.

9. A cable injector system, comprising:
   a cable;
   a hydraulic cable injector having a first end and a second end and including:

a first stripper assembly positioned at the first end to receive the cable and provide a lower seal for the hydraulic cable injector at the first end;

a first wye joint coupled to the first stripper assembly;

a flow tube assembly operatively coupled to the first wye joint and having a flow tube that receives the cable after the cable extends through the first wye joint;

a second wye joint coupled to the flow tube assembly;

a second stripper assembly coupled to the second wye joint and providing an upper seal for the hydraulic cable injector;

a third stripper assembly positioned at the second end and providing a tubing seal; and a separator interposing the second and third stripper assemblies and defining a central pathway that feeds the cable into the third stripper assembly from the second stripper assembly;

a tubing coupled to the second end of the hydraulic cable injector to receive the cable from the third stripper assembly;

a first fluid circuit for circulating a first fluid through the flow tube, wherein the lower and upper seals prevent the first fluid from migrating past the first and second stripper assemblies, respectively; and a second fluid circuit for circulating a second fluid through the tubing, wherein the tubing seal prevents the second fluid from migrating past the third stripper assembly and commingling with the first fluid.

10. The cable injector system of claim 9, wherein the cable is selected from the group consisting of a fiber optic cable, wireline, braided wire cable, slickline, an electricity-conducting wire, a capillary, or any combination thereof.

11. The cable injector system of claim 9, wherein the tubing is selected from the group consisting of coiled tubing, casing, production tubing, drill string, or any combination thereof.

12. The cable injector system of claim 9, wherein the separator provides an atmospheric buffer between the hydraulic cable injector and the tubing.

13. The cable injector system of claim 9, wherein the first fluid is water and the second fluid is a liquid solution.

14. The cable injector system of claim 13, wherein the liquid solution includes a friction-reducing chemical.

15. The cable injector system of claim 9, wherein the first wye joint provides a first flow port and the second wye joint provides a second flow port, and wherein the first fluid is introduced into the hydraulic cable injector via the first flow port and discharged from the hydraulic cable injector via the second flow port.

16. The cable injector system of claim 9, further comprising a flow tube anchor that interposes the lower wye joint and the flow tube assembly.

17. A method, comprising:

introducing a cable into a first end of a hydraulic cable injector, the hydraulic cable injector having a first stripper assembly positioned at the first end to receive the cable, a first wye joint coupled to the first stripper assembly, a flow tube assembly operatively coupled to the first wye joint, and a second wye joint coupled to the flow tube assembly, wherein the flow tube assembly has a flow tube that receives the cable after the cable extends through the first wye joint;

circulating a first fluid through the flow tube via a first fluid circuit;

preventing the first fluid from migrating past the first stripper assembly with a lower seal generated by the first stripper assembly at the first end;

preventing the first fluid from migrating past the second stripper assembly with an upper seal generated by a second stripper assembly coupled to the second wye joint;

injecting the cable into a tubing coupled to a second end of the hydraulic cable injector, the hydraulic cable injector having a third stripper assembly positioned at the second end;

circulating a second fluid through the tubing via a second fluid circuit; and preventing the second fluid from migrating past the third stripper assembly and commingling with the first fluid with a tubing seal generated by the third stripper assembly.

18. The method of claim 17, wherein the first fluid is water, and wherein circulating the first fluid through the flow tube comprises applying a friction drag force on the cable with the first fluid to advance the cable through the flow tube.

19. The method of claim 17, wherein circulating the second fluid through the tubing via the second fluid circuit comprises applying a friction drag force on the cable with the second fluid to advance the cable through the tubing.

20. The method of claim 17, further comprising applying back tension on the cable as the cable is introduced into the first end of the hydraulic cable injector.

21. The method of claim 17, further comprising providing an atmospheric buffer between the hydraulic cable injector and the tubing with a separator interposing the second and third stripper assemblies.

* * * * *